March 14, 1961 B. A. FULTON 2,974,767
COMBINED PUMP AND TORQUE TRANSMITTING COUPLING
Filed May 26, 1958
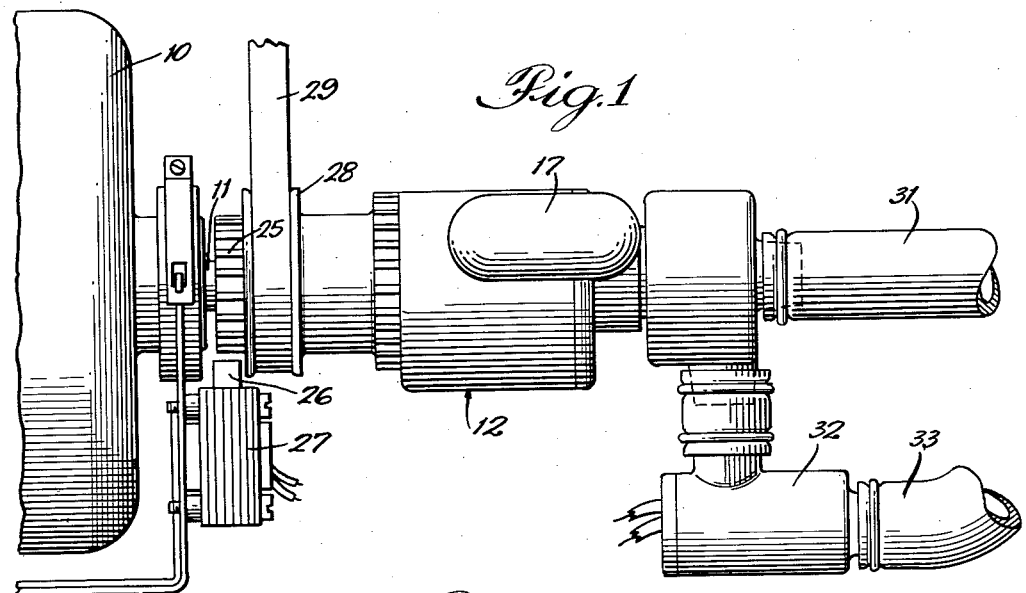
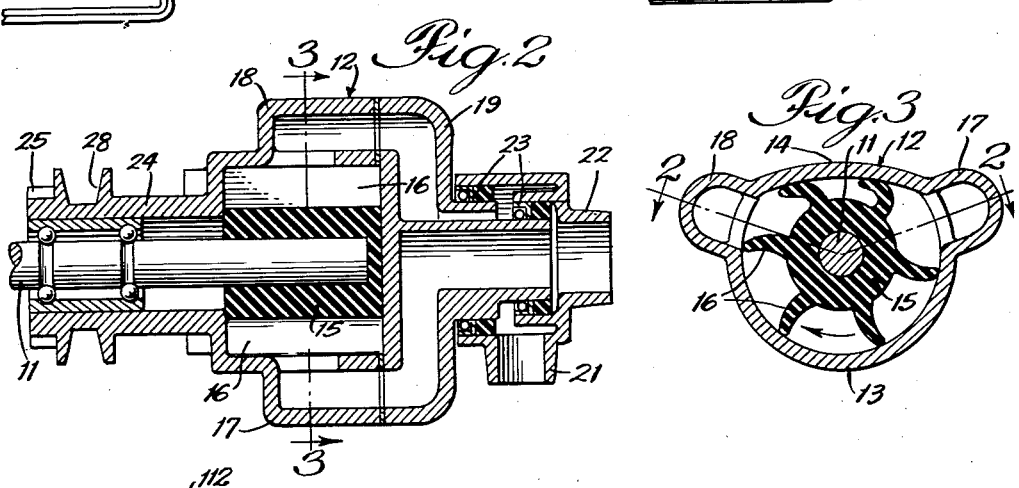
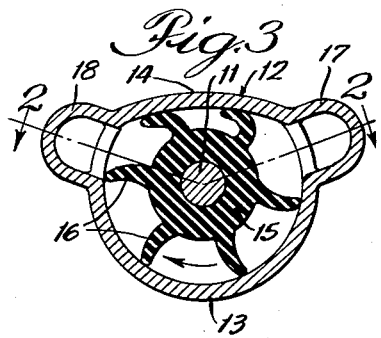
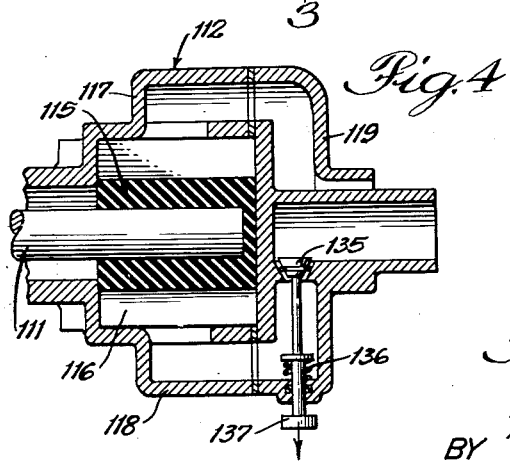
INVENTOR:
Bertram A. Fulton
BY Bair, Freeman & Molinare
ATTORNEYS.

United States Patent Office 2,974,767
Patented Mar. 14, 1961

2,974,767

COMBINED PUMP AND TORQUE TRANSMITTING COUPLING

Bertram A. Fulton, 247 Scott St., Glen Ellyn, Ill.

Filed May 26, 1958, Ser. No. 737,838

2 Claims. (Cl. 192—12)

This invention relates to a combined pump and torque transmitting coupling and more particularly to a rotary unit which can function either as a positive displacement pump or as a coupling to transmit torque.

In washing machines in which clothes are washed in a container and the container is then spun at high speed to extract water from the clothes, it is desirable to provide a pump to circulate the water during washing but not during extraction of water from the clothes and it is further necessary to provide a clutch or coupling to drive the container at high speed during extraction. There are other applications involving similar requirements such, for example, as various types of fluid drive units.

It is one of the objects of the present invention to provide a combined pump and torque transmitting coupling for use in such applications in which the same unit functions both as a liquid circulating pump and as a coupling to transmit rotary motion.

Another object is to provide a combined pump and torque transmitting coupling in which the parts are rotatable relative to each other and one part is held against rotation during operation as a pump and the outlet port of the pump is closed with the parts being rotatable as a unit during coupling operation.

According to a feature of the invention, the unit comprises a housing having an eccentric inner wall portion and a rotor in the housing having flexible vanes engaging the wall portion. The vanes of the rotor will flex to maintain sliding contact with the housing wall and may yield in response to excessive pressure to limit the pressure and prevent damage to the parts.

The above and other objects and features of the invention will be more readily apparent from the following description when read in connection with the accompanying drawing, in which:

Figure 1 is a side elevation of a combined pump and torque transmitting coupling assembly embodying the invention;

Figure 2 is a section through the combined pump and coupling unit on the line 2—2 of Figure 3;

Figure 3 is a transverse section on the line 3—3 of Figure 2; and

Figure 4 is a view similar to Figure 2 of an alternative construction.

In the assembly, as shown in Figure 1, the combined unit is adapted to be driven by a power source such as an electric motor which will drive the pump rotor during pumping operations and from which torque will be transmitted to externally driven parts during torque transmitting coupling operations. The motor has a shaft 11 which, as best seen in Figure 2, extends into the combined pump and coupling unit, indicated generally at 12, and is connected to the internal rotor thereof. The unit 12 comprises an outer casing or housing 13 which is circular throughout the major portion of its circumference and is flattened at one side, as indicated at 14. The shaft 11 is coaxial with the circular portion of the housing and carries a rotor 15 fitting in the housing and rotatable therein as the shaft turns relative to the housing.

According to a feature of the invention, the rotor 15 is formed of a flexible material, such as rubber or synthetic rubber, with a cylindrical hub portion fitting over and secured to the end of the shaft 11 and with a series of vanes 16 extending outward from the hub portion to contact the interior surface of the housing 12. As seen in Figure 3, the vanes are of such a length that they will be deflected slightly where they engage the circular section portion of the housing and will be substantially deflected at the point where they engage the eccentric wall portion 14 of the housing. The vanes will maintain sealing wiping contact with the interior of the housing throughout its full circumference to prevent any leakage of fluid between the vanes and the housing although upon development of excessive pressure, the vanes may yield to bypass the fluid thereby to limit the fluid pressure or torque which can be developed in the unit.

The housing 12 is formed with outwardly projecting passages 17 and 18 on opposite ends of the eccentric wall portion 14 which define respectively inlet and outlet ports for the housing. The end of the housing is closed by a cover plate 19 having a flat end surface against which the edges of the vanes 16 seal and having passages therein communicating with the passages 17 and 18, respectively. As best seen in Figure 2, the passage 18 communicates with an outer outlet nipple 21 in the cover and the passage 17 communicates with a central inlet nipple 22. Rotary seals 23 are provided between concentric tubular extensions of the passages 17 and 18 and the inlet and outlet nipples to prevent leakgae of fluid during relative rotation of the housing and the nipples.

The housing 12 is adapted to be held against rotation when the unit is to be operated as a pump and to be released for rotation when the unit is to operate as a coupling. For this purpose, the housing is formed with a sleeve extension 24 coaxial with the shaft 11 and terminating at one end in a series of clutch teeth 25. The teeth 25 are adapted to be engaged by a locking pawl 26 which can engage the teeth to hold the housing against rotation or which is movable away from the locking teeth to permit the housing to rotate freely. The locking pawl 26 is controlled by a solenoid 27 which can function either to urge the pawl into engagement with the locking teeth when the solenoid is energized and to permit the pawl to fall away from the teeth by gravity or under the influence of a spring when the solenoid is de-energized or which could, if desired, function in the opposite manner to engage the teeth under the influence of the spring when the solenoid is de-energized and to be pulled away from the teeth when the solenoid is energized.

The extension 24 may serve also as the driven member of a coupling when the unit is functioning as a coupling. For this purpose the extension carries a driving means, shown as a V-pulley 28 which may be engaged by a belt 29 coupling the pulley to a mechanism to be driven.

The unit is supplied with liquid from any convenient source through a hose 31 coupled to the inlet nipple 22. Liquid is discharged from the unit past a solenoid valve 32 to a discharge conduit or hose 33. The valve may be remotely controlled in any desired manner to be open when the unit is to function as a pump and to be closed to prevent the discharge of fluid when the unit is to function as a coupling.

In a typical washing machine operation, during the washing cycle the agitator or other washing mechanism may be driven by the motor 10 through gearing, belts, or the like, not shown, and the tub in which the clothes are contained may be held stationary. At this time, the unit of the invention is operated as a pump to circulate detergent liquid through the tub for which purpose the pawl 26 is engaged with the locking teeth to hold the casing 12 stationary and the valve 32 is open. As the motor turns, the rotor will turn in the housing in a clockwise direction, as seen in Figure 3, to draw in liquid through the inlet passage 17 and to force the liquid out through the outlet passage 18 and past the valve 32. In a normal washing operation, the unit therefore functions as a circulating pump to maintain a constant circulation of the detergent liquid through filters, or the like, as desired.

When it is desired to utilize the unit as a coupling, for example, to spin the tub at high speed for extraction the pawl 26 is retracted out of engagement with the locking teeth 25. In some cases the pump friction will create sufficient torque to drive the load but where greater torque transmission is required the valve 32 may be closed to trap liquid in the housing. At this time the housing 12 will be driven with the rotor to turn the driving pulley 28 and the belt 29. The belt 29 may be coupled to the tub to rotate it at high speed for extraction of detergent liquid or rinse water from the clothes. It will be noted that if the torque load is excessive the flexible vanes 16 may deflect to bypass the liquid thereby to limit the torque which can be developed and to prevent damage to the parts. Similarly, during pumping if the pressure should become excessive the vanes can deflect to prevent building up of dangerous pressures.

Instead of utilizing a valve, such as the valve 32, an automatic speed responsive valve may be employed, as illustrated in Figure 4, wherein parts corresponding to like parts in Figures 1 to 3 are indicated by the same reference numerals, plus 100. In this construction, the inlet and outlet ports are reversed so that the inlet supply of liquid comes through the outer concentric passage in the cover 119 and the liquid is discharged through the central hub portion in the end member 119. Liquid flowing from the unit into the central discharge passage normally flows past a poppet type valve 135 which is adapted to close a port opening radially into the center outlet passage and which is normally urged away from its seat by a light spring 136. The valve stem may be weighted or may carry a weighted button, as shown at 137, so that it will seat more tightly in response to centrifugal force.

In operation of this unit when the casing or housing 112 is held stationary the spring 136 will unseat the valve 135 so that the fluid under pressure delivered by the unit will flow out through the central outlet passage. When the housing is released for rotation frictional forces in the unit and resisting the flow of fluid therethrough will create a drag on the housing tending to turn it with the shaft and rotor. As the rotary speed of the housing increases, centrifugal force will act on the valve and particularly on the weighted portion 137 thereof, to urge the valve against its seat with a force proportional to the speed. Thus, as the speed increases the torque transmitting capabilities of the unit increase up to the point at which the vanes of the rotor will be deflected.

While the invention has been particularly described in connection with a washing machine use, it will be understood that this is only by way of one example of the use to which the invention may be put and that the scope of the invention is not intended to be limited to this purpose than otherwise by the terms of the appended claims.

What is claimed is:

1. A combined pump and torque transmitting coupling comprising a driving shaft, a pump rotor on the shaft, a hollow housing enclosing the rotor and at least a portion of whose inner wall is eccentric relative to the shaft axis, outwardly extending vanes on the rotor slidably engaging the inner wall of the housing, the housing being formed with spaced inlet and outlet ports between which fluid is circulated upon rotation of the rotor in the housing, an unrestricted supply conduit communicating with the inlet port to supply fluid thereto, a discharge conduit connected to the outlet port to conduct fluid therefrom to a desired point of use, means mounting the rotor for rotation coaxially with the shaft, releasable brake means to hold the housing against rotation for a pumping operation, control means for the brake means to control engagement and release thereof, drive means on the housing formed for connection to a load to be driven, and a valve controlling the outlet port to create torque between the rotor and housing when the valve is closed, the vanes on the rotor being flexible to bend as the rotor turns in the casing and to yield in response to a predetermined high pressure at the outlet port.

2. A combined pump and torque transmitting coupling comprising a driving shaft, a pump rotor on the shaft, a hollow housing enclosing the rotor and at least a portion of whose inner wall is eccentric relative to the shaft axis, outwardly extending vanes on the rotor slidably engaging the inner wall of the housing, the housing being formed with spaced inlet and outlet ports between which fluid is circulated upon rotation of the rotor in the housing, an unrestricted supply conduit communicating with the inlet port to supply fluid thereto, a discharge conduit connected to the outlet port to conduct fluid therefrom to a desired point of use, means mounting the rotor for rotation coaxially with the shaft, an axial extension at one end of the casing formed with concentric passages communicating with the ports respectively, a collar formed with concentric passages registering with and rotatably sealed to the passages in the extension respectively, releasable brake means to hold the housing against rotation, control means for the brake means to control engagement and release thereof, drive means on the housing formed for connection with a load to be driven, and a valve in the one of the passages communicating with the outlet port.

References Cited in the file of this patent

UNITED STATES PATENTS

| 2,371,227 | Dodge | Mar. 13, 1945 |
| 2,371,228 | Dodge | Mar. 13, 1945 |
| 2,387,230 | Bock | Oct. 23, 1945 |
| 2,636,443 | Rand | Apr. 28, 1953 |
| 2,648,287 | Thoren et al. | Aug. 11, 1953 |
| 2,789,511 | Doble | Apr. 23, 1957 |

FOREIGN PATENTS

| 251,900 | Great Britain | May 13, 1926 |
| 539,241 | Great Britain | Sept. 2, 1941 |
| 976,152 | France | Oct. 25, 1950 |